United States Patent [19]
Meyer et al.

[11] Patent Number: 5,301,545
[45] Date of Patent: Apr. 12, 1994

[54] METHOD AND SYSTEM FOR MEASURING IRREGULARITIES IN THE SURFACE OF A COMMUTATOR

[75] Inventors: James A. Meyer, Erie; James R. Christensen, North East; Douglas A. Dunbar, Erie, all of Pa.

[73] Assignee: General Electric Company, Erie, Pa.

[21] Appl. No.: 956,525

[22] Filed: Oct. 5, 1992

Related U.S. Application Data

[63] Continuation of Ser. No. 679,884, Apr. 3, 1991, abandoned.

[51] Int. Cl.$^5$ ............................................. G01B 7/34
[52] U.S. Cl. .................................................. 73/105
[58] Field of Search ................ 73/104, 105, 865.9, 73/866.5; 33/655, 656

[56] References Cited

U.S. PATENT DOCUMENTS

| | | | |
|---|---|---|---|
| 2,240,278 | 4/1941 | Abbott et al. | 73/105 |
| 3,434,086 | 3/1969 | Houpt et al. | 73/105 |
| 3,669,300 | 6/1987 | Hall et al. | 73/105 |

OTHER PUBLICATIONS

Profiler (Brochure), Dynamic Controls Ltd, Christchurch, New Zealand.
Seekins, "Evaluating Surface Finishes", ISA Journal, Feb. 1963.

Primary Examiner—Robert Raevis
Attorney, Agent, or Firm—R. Thomas Payne; Marvin Snyder

[57] ABSTRACT

Irregularities in the outer surface of a commutator are identified and measured while the commutator is in the motor by removing a brush from its brush holder, and securing a jig in the brush holder. The jig has a sensor which generates electrical signals in response to movement of a profiling foot at an end of the sensor. The sensor is adjusted so that the profiling foot touches the commutator surface, and the commutator is then rotated at least one full revolution. By measuring movement of the profiling foot as the commutator turns, as observed through the output signals of the sensor, irregularities in the commutator surface can be identified and measured. The output signals of the sensor can be recorded or otherwise stored for analysis. The profiling foot is pivoted so that it rests flat against the commutator contacts, even if the brush holder is not properly aligned with the commutator.

19 Claims, 2 Drawing Sheets

METHOD AND SYSTEM FOR MEASURING IRREGULARITIES IN THE SURFACE OF A COMMUTATOR

This application is a continuation of application Ser. No. 07/679,884, filed Apr. 3, 1991, now abandoned.

This invention relates to methods and a system for identifying and measuring irregularities in a commutator surface, and more particularly, to methods and apparatus for electronically inspecting the outer surface of a commutator without removing it from service.

BACKGROUND OF THE INVENTION

Direct current motors and generators are used in many applications, including train locomotives. Such machines have a stator and a rotor in a housing. The rotor has several coils and a cylindrical commutator, and the commutator has a plurality of electrical contacts separated by insulators. Electric current is supplied to the rotor coils through the commutator contacts and electrically conductive brushes secured to the machine housing. The brushes are pressed against the commutator contacts by springs.

With use, the brushes wear down the outer surface of the commutator, often unevenly. If the surface is excessively uneven, with significant irregularities, the brushes will momentarily lose contact with the commutator surface as the commutator rotates, causing arcing and possibly significant damage to the machine.

To avoid such arcing, the outer surface of the commutator must be periodically measured for roundness and smoothness by removing the rotor and placing it in a lathe or the like. A linear voltage differential transducer, or LVDT, is placed against a selected portion of the commutator, and a reference output voltage is set. The commutator is then rotated, and changes in the radius of the commutator, including those which occur where there are irregularities in the outer surface of the commutator, are electronically measured and recorded on a chart recorder. The recorded output signals of the LVDT are analyzed to determine whether or not the commutator must be repaired. This system is inefficient if repairs are not needed, however, because a great deal of time is required to remove the rotor, install it in a lathe, and replace the rotor in the machine. It is particularly inefficient with locomotives and other applications where the machines are large and heavy. Thus, there is a need for methods and a system for measuring the roundness of the outer surface of a commutator to identify irregularities, without removing the rotor from the machine.

Accordingly, one object of this invention is to provide new and improved methods and a system for identifying and measuring irregularities in the outer surface of a commutator.

Another object is to provide new and improved methods and a system for identifying and measuring irregularities in a commutator surface, without removing the commutator from the machine in which the commutator is installed.

SUMMARY OF THE INVENTION

In keeping with one aspect of this invention, methods and a system are provided for identifying and measuring irregularities in the outer surface of a commutator in an electric machine such as a motor or generator, without removing the rotor to which the commutator is secured. A selected brush is removed from its brush holder and a jig is secured in the brush holder. The jig has a sensor which generates electrical signals in response to movement of a profiling foot secured to an end of the sensor. The jig also has a threaded portion for adjusting the sensor so that the profiling foot touches the commutator surface under spring tension. The commutator is rotated at least one full revolution, and movement of the profiling foot is measured by the sensor, which produces an electrical output which identifies and measures irregularities in the outer surface of the commutator. The output of the sensor can be recorded on a chart recorder or stored in some other manner, for analysis and review. When the test is completed, the jig can be easily removed and the brush replaced. In this manner, irregularities in the surface of the commutator are easily identified and measured, without removing the rotor from the machine, or removing the machine from service.

BRIEF DESCRIPTION OF THE DRAWINGS

The above mentioned and other features of an embodiment of this invention and the manner of obtaining them will become more apparent, and will be best understood by reference to the following description, taken in conjunction with the accompanying drawings, in which.

DETAILED DESCRIPTION

Figure 1:
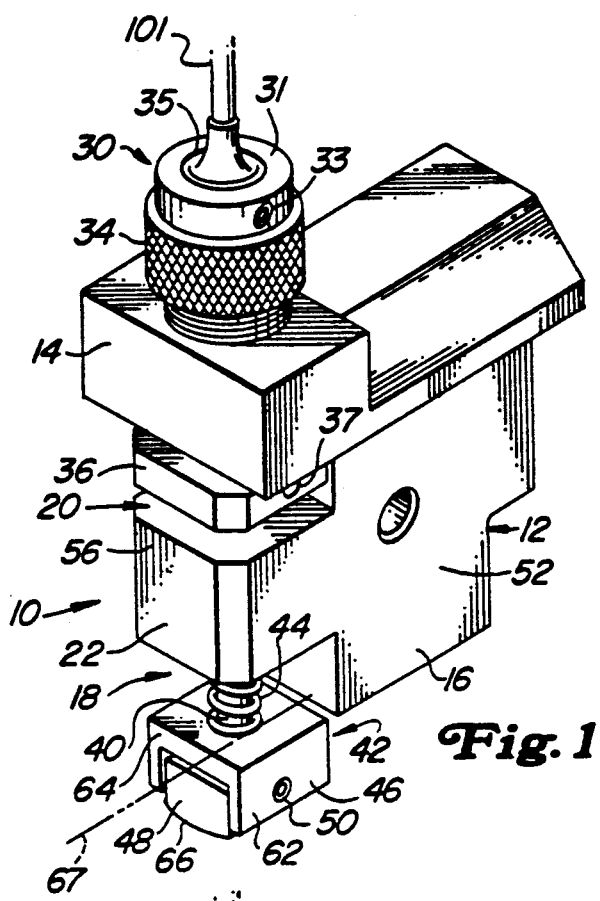
FIG. 1 is a perspective view of jig/sensor combination made in accordance with the principles of this invention.
Figure 2:
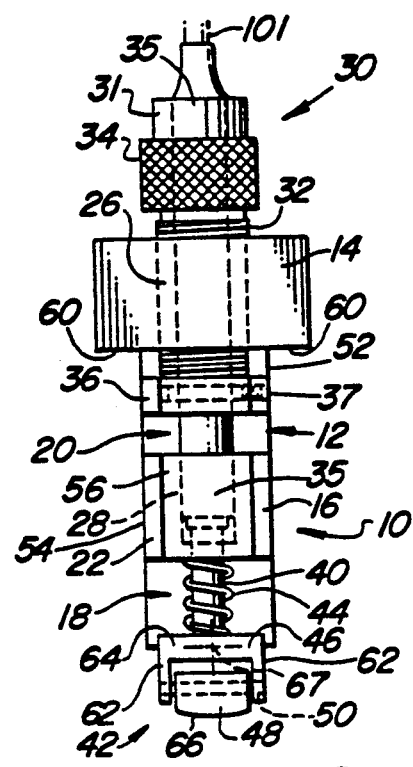
FIG. 2 is a side view of the jig/sensor combination of FIG. 1, taken from the left side.
Figure 3:
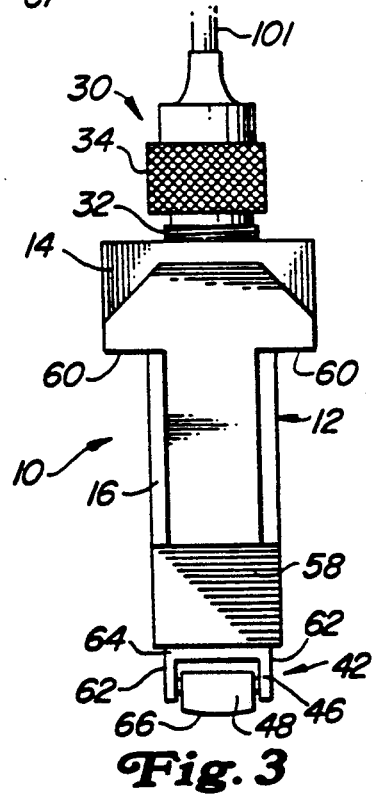
FIG. 3 is a side view of the jig/sensor combination of FIG. 1, taken from the right side.

As seen in FIGS. 1, 2 and 3, a jig 10 includes a solid body 12 having a top portion 14 and a bottom portion 16. The bottom portion 16 includes a notch 18, a slot 20, and a shoulder 22 between the notch 18 and the slot 20.

The top portion 14 includes a threaded opening 26, and the shoulder 22 includes an opening 28. A linear voltage differential transducer assembly 30 (LVDT) is threaded in the opening 26, and extends through the opening 28.

The LVDT assembly 30 includes a collar 31 secured to an LVDT 35 by a set screw 33, a threaded sleeve 32, and an adjustment knob 34 which turns the sleeve 32. The transducer 35 extends through the sleeve 32. A stop 36 secured to the LVDT 35 by a set screw 37, and a shaft 40 extends away from the LVDT 35. The collar 31 and the stop 36 secure the LVDT 35 with respect to the threaded sleeve 32 so that the LVDT 35 moves up and down with the threaded sleeve 32 as the knob 34 is turned. However, the stop 36 prevents the LVDT 35 from rotating with the threaded sleeve 32 because the stop 36 presses against the body 12 when subjected to rotational forces.

A profiling foot assembly 42 is threadedly secured to the end of the shaft 40, and a spring 44 pushes the foot assembly 42 down from the LVDT assembly 30. The foot assembly 42 includes a U-shaped housing 46 and a pivoting foot 48, which is secured to the housing 46 by a pin 50. The assembly 42 moves up and down when the knob 34 is turned, but does not rotate.

The jig 10 is generally rectangular in width and depth, and includes two spaced, opposing wide faces 52, 54, and two spaced, opposing narrow faces 56, 58. The narrow faces 56, 58 are wider at the top portion 14 than at the lower portion 16, which creates ledges 60 where the portions 14, 16 meet.

The U-shaped housing 46 includes opposed, spaced rectangular faces 62 which are parallel with the faces 52, 54 of the jig 10, and U-shaped faces 64, which are parallel with the narrow faces 56, 58. The pin 50 extends through the faces 62. The foot 48 has a bottom surface 66 which is curved about an axis 67 which is transverse to the axis of the pin 50.

Figure 4:
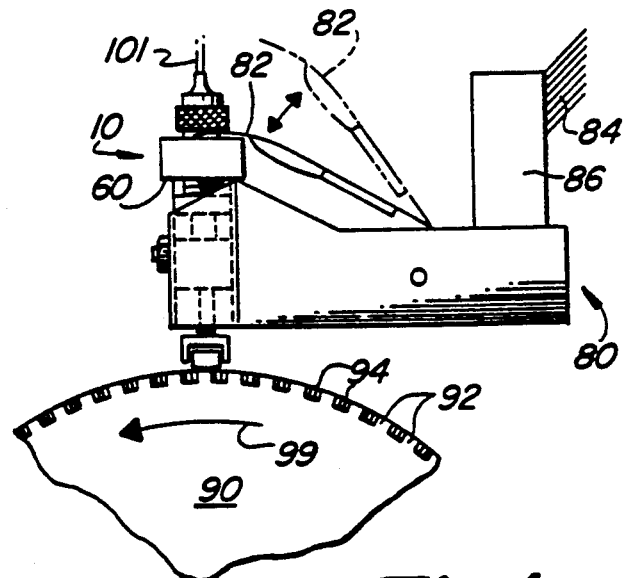
FIG. 4 is a side view of the jig/sensor combination of FIG. 1, installed in a brush holder.
Figure 5:
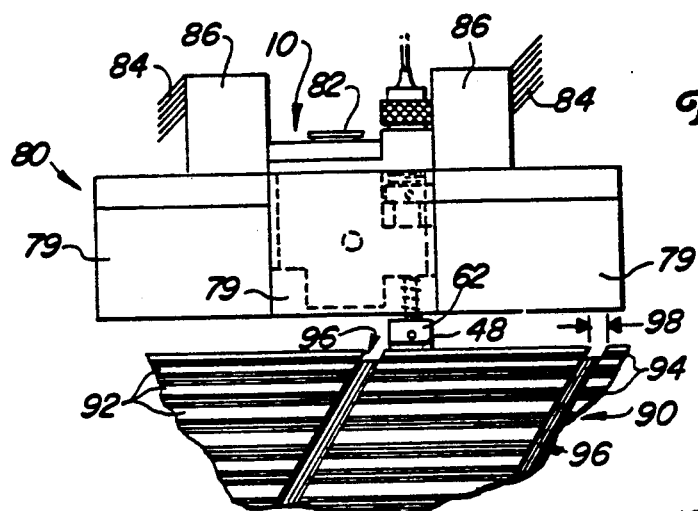
FIG. 5 is a front view of the jig/sensor combination of FIG. 4.
Figure 6:
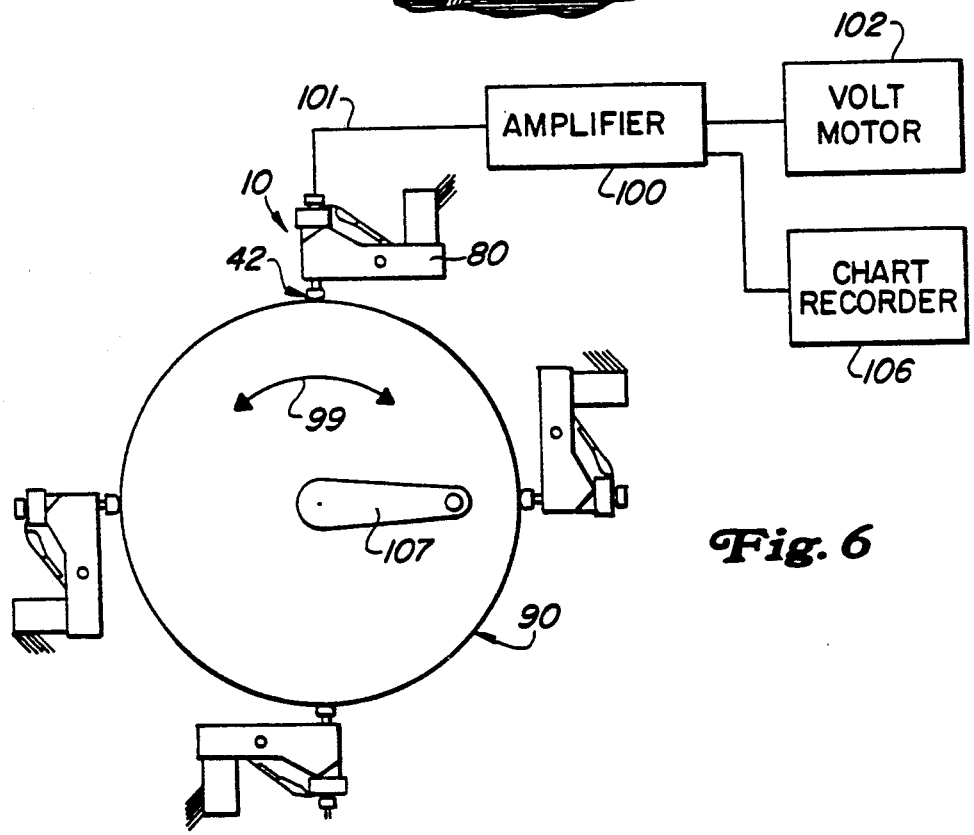
FIG. 6 is a partial schematic diagram illustrating how the system of FIG. 1 is used.

FIGS. 4, 5 and 6 show how the jig 10 is used to identify and measure irregularities in the outer surface of a commutator. The commutator could be in an electric motor, generator or other machine. The jig 10 can be easily adapted for large machines such as the traction motors used in diesel locomotives.

The jig 10 is secured in a brush slot 79 of a brush holder 80 by lifting a selected spring bar 82, removing the brush beneath the spring bar 82, inserting the jig 10 in place of the brush and dropping the spring bar 82 over the jig 10, as in FIGS. 4 and 5. The ledges 60 rest on the brush holder 80 to secure the jig 10 in place.

The brush holder 80 has three brush slots 79, and the jig 10 can be placed in any of the three slots. The brush holder 80 is secured to a machine frame or housing 84 by insulating post 86.

The machine in which the jig 10 is used also has a commutator 90. The commutator 90 includes a plurality of spaced commutator contacts 92 which are separated by insulators 94. The contacts 92 are rectangular, and are oriented with their longest dimension parallel to the axis of the commutator, and perpendicular to the direction of commutator rotation. The commutator 90 may also have a spiral groove 96 which has a width 98.

Figure 7:
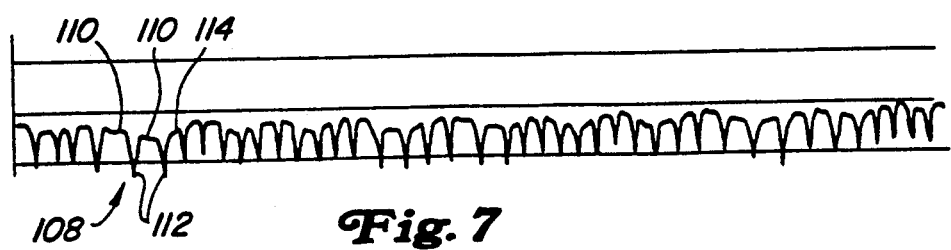
FIG. 7 is a chart recording showing the results of measurements made with the system of FIG. 6.

When the jig 10 is installed, the foot assembly is oriented so that the axis 67 of the surface 66 is parallel to the longest dimension of the contacts 92, and perpendicular to the direction of rotation 99 of the commutator. The width of the foot 48 across the surface 62 is wider than the width 98, but is narrow enough to adequately identify and measure irregularities in the portion of the commutator surface beneath the surface 66. The LVDT 35 generates an output signal which changes as the foot 48 moves up and down. The output signal is fed to an amplifier 100 by a cable 101, and the output of the amplifier 100 is fed to a volt meter 102 and a chart recorder 106. The output could also be stored and analyzed in a computer, if desired. When the commutator is turned manually, with a crank 107, a motor, a truck or the like, the LVDT 35 detects irregularities in the outer surface of the commutator, including bumps and depressions, and those irregularities are recorded by the chart recorder 106 in the manner shown in FIG. 7. In locomotives, the commutator can be turned by pulling the locomotive with a truck or another locomotive.

The recorder output 108 includes peaks 110 which represent the output of the LVDT 35 as it passes over the commutator contacts 92, and valleys 112, which represent the LVDT output as it passes over the insulators 94. If a commutator contact 92 is in good condition, it will produce a substantially flat or square output between adjacent valleys 112. Contacts 92 which have significant irregularities will produce sloped outputs, as shown at 114. In this manner, the commutator surface can be examined, and irregularities in the surface can be identified and measured.

The LVDT assembly 30 should be adjusted with the knob 34 so that the foot assembly 42 can move both up and down a sufficient distance to take accurate, meaningful measurements. When adjusting the LVDT assembly 30, the final adjustment of the knob 34 should push the LVDT 35 down, to eliminate play.

The accuracy of the measurements is improved because the foot 48 swivels around the pin 50, detecting changes or irregularities across the entire surface 66, and not just the highest point in that portion of the commutator surface in contact with the surface 66. The assembly 42 is oriented so that the left and right sides of the foot 48 in FIG. 5 can move up and down as the commutator turns, without the leading and trailing edges of the foot 48 pivoting. In addition, the pivoting action of the foot 48 allows the surface 66 to rest flat against the commutator surface, even if the brush holder is not properly aligned with the commutator surface. Moreover, the foot 48 does not ride on its edge, and does not fall into the grooves 96.

The surface 66 must be smooth to obtain accurate, reliable measurements. The surface 66 may be protected from accidental damage by making it out of hardened steel (such as Rockwell B63). The radius of the surface 66 affects the depth to which the foot 48 drops into the insulator spaces between the commutator contacts, which in turn affects the depth of the valleys 112 in FIG. 7. The radius of the surface 66 should be chosen to produce clear valleys 112, without the foot 48 colliding with successive commutator contacts as the commutator is rotated.

Readings can be taken along several points on the commutator surface with the jig 10. The jig 10 can be turned 180° from the position shown in FIG. 5, to measure a different portion of the commutator surface, or the jig can be placed in either of the other two brush slots 79 of the brush holder 80. In addition, several jigs 10 can be inserted in one or more brush holders at a time, to produce several simultaneous measurements. In locomotives, measurements can be made in about two hours, which is much less than the time required to remove the rotor, and install it in a lathe for measurement.

Specifically, measurements of all tractions motors (4 or 6 motors) on a locomotive can be made in about two hours. This is considerable less time than what would be required it each traction motor wheel set were individually removed from the locomotive, each wheel axel and motor disassembled, the rotor removed from the frame and installed in a lathe for commutator profiling.

The many advantages of this invention are now apparent. Commutators can be easily and efficiently inspected without removing them from service. The commutators can be inspected more often, reducing the incidence of arcing and damage.

While the principles of the invention have been described above in connection with specific apparatus and applications, it is to be understood that this description is made only by way of example and not as a limitation on the scope of the invention.

What is claimed is:

1. A method for identifying and measuring irregularities in the outer surface of a commutator installed in an electric motor having at least one brush operatively positioned in at least one brushholder, comprising the steps of:

removing at least one brush from at least one brushholder;

securing a sensor means in the brushholder having a profiling foot operatively connected thereto for generating electrical output signals in response to movement of the profiling foot at an end of the sensor means;

adjusting the sensor means so that the profiling foot contacts the commutator surface under tension and is capable of moving toward and away from the surface;

rotating the commutator at least one full revolution;

measuring the relative movement of the profiling foot in sliding contact with the commutator surface, to identify irregularities on the commutator surface; and as the commutator rotates, allowing the profiling foot to pivot.

2. The method of claim 1 further comprising the step of:

storing the movement of the sensor means for analysis.

3. A system for identifying and measuring irregularities in the outer surface of a commutator installed in an electric motor having at least one brush in a brushholder, the system comprising:

a jig, having a profiling foot at one end;

means for pivoting the profiling foot;

sensor means, operatively connected to the jig, for generating electrical signals as the profiling foot moves in sliding contract with the commutator;

means for adjusting the sensor so that the profiling foot contacts the commutator surface under tension, the profiling foot being movable toward and away from the commutator surface;

means for rotating the commutator at least one full revolution; and means for recording the relative movement of the profiling foot such that irregularities in the outer surface of the commutator are identified by the output signals of the sensor means.

4. The system of claim 3 further comprising:

means for storing data representative of the movement of the profiling foot.

5. The system of claim 4 wherein the storing means comprises a chart recorder.

6. The system of claim 3 wherein the pivoting means further comprises:

a U-shaped piece and a pin which secures the profiling foot inside the U-shaped piece.

7. The system of claim 3 further comprising:

means for removing the brush and securing the jig.

8. The system of claim 7 wherein the removing and securing means further comprises:

a spring bar placed over the jig to secure the jig in the brushholder, the jig having a lip which rests against the brushholder when the jig is installed in the brushholder and the spring bar is placed over the jig.

9. The system of claim 3 wherein the sensor means comprises:

a linear voltage differential transducer.

10. The system of claim 9 further including a shaft, extending away from the transducer, which can move with respect to the transducer, and having the profiling foot secured thereto; and a spring for urging the foot away from the transducer.

11. The system of claim 10 wherein the jig includes a threaded opening, and the transducer has a threaded sleeve which cooperates with the threaded opening such that the transducer extends through the sleeve, a collar is secured to the transducer at one end of the sleeve and a stop is secured to the transducer at the other end of the sleeve, the stop preventing the transducer from rotating with the sleeve.

12. The system of claim 5 wherein the profiling foot further comprises:

a curved surface having an axis which is parallel to the axis of the commutator and perpendicular to the direction of movement of the commutator for contacting the commutator surface.

13. A system for inspecting the condition of surface of a commutator comprising:

a jig operatively positionable in a brushholder;

a profiling foot, operatively connected to the jig, for sliding along the commutator surface;

sensor means, operatively connected to the profiling foot and to the jig, for generating signals corresponding to the deviation of the height of the commutator surface relative to a predetermined height;

means for positioning the profiling foot in tension contact with the commutator surface and for allowing the profiling foot to move both toward and away from the commutator surface;

means for recording the signals generated by the sensor means, wherein the profiling foot further comprises:

a U-shaped housing;

pivoting means operatively connected to the U-shaped housing such that the profiling foot rests flat against the commutator surface regardless of the alignment of the brushholder.

14. The system of claim 13 wherein the surface of the profiling foot in contact with the commutator surface in the commutation direction of rotation is sufficient to produce distinct images of the commutator contact.

15. The system of claim 14 wherein the profiling foot is oriented relative to the surface of commutator such that the U-shaped housing remains perpendicular to the commutator contacts.

16. The system of claim 15 wherein the width of the surface in the direction of rotation of the commutator is greater than the width of a spiral groove in the commutator.

17. A system for inspecting the condition of surface of a commutator comprising:

a jig operatively positionable in a brushholder;

a profiling foot, operatively connected to the jig, for sliding along the commutator surface;

sensor means, operatively connected to the profiling foot and to the jig, for generating signals corresponding to the deviation of the height of the commutator surface relative to a predetermined height;

means for positioning the profiling foot in tension contact with the commutator surface and for allowing the profiling foot to move both toward and away from the commutator surface; and means for recording the signals generated by the sensor means, wherein the tension between the profiling foot and the commutator is adjustable.

18. The system of claim 13 wherein the profiling foot has a smooth hardened steel surface.

19. A system for identifying and measuring irregularities in the outer surface of a commutator installed in an electric motor having at least one brush operatively positioned in at least one brushholder, the system comprising:

means for removing at least one brush from at least one brushholder;

sensor means, secured in the brushholder having a profiling foot operatively connected thereto, for generating electrical output signals in response to movement of the profiling foot at an end of the sensor means;

means for adjusting the sensor means so that the profiling foot contacts the commutator surface under tension and is capable of moving toward and away from the surface;

means for rotating the commutator at least one full revolution;

means for measuring the relative movement of the profiling foot in sliding contact with the commutator surface, so that irregularities on the commutator surface are identified; and means, as the commutator rotates, for allowing the profiling foot to pivot.

* * * * *

UNITED STATES PATENT AND TRADEMARK OFFICE
CERTIFICATE OF CORRECTION

PATENT NO. : 5,301,545

DATED : April 12, 1994

INVENTOR(S) : JAMES A. MEYER, ET AL

It is certified that error appears in the above-identified patent and that said Letters Patent is hereby corrected as shown below:

In the drawings, Sheet 2, Figure 6 delete "MOTOR" and substitute --METER--.

Signed and Sealed this

Twenty-fifth Day of October, 1994

Attest:

BRUCE LEHMAN

Attesting Officer   Commissioner of Patents and Trademarks